Sept. 28, 1965  B. J. SCHWEITZER  3,208,736
CONCRETE MIXER

Filed Dec. 2, 1963  2 Sheets-Sheet 1

INVENTOR.
BILLY J. SCHWEITZER
BY
John H. Widdowson
ATTORNEY

Sept. 28, 1965   B. J. SCHWEITZER   3,208,736
CONCRETE MIXER
Filed Dec. 2, 1963   2 Sheets-Sheet 2

INVENTOR.
BILLY J. SCHWEITZER
BY John H. Widdowson
ATTORNEY 3,208,736
CONCRETE MIXER
Billy J. Schweitzer, Wichita, Kans., assignor to Universal Pulleys Co., Inc., Wichita, Kans., a corporation of Kansas
Filed Dec. 2, 1963, Ser. No. 327,390
3 Claims. (Cl. 259—177)

This invention relates to mixing means for concrete, cement or the like and other materials and to means for mounting same on a vehicle. In a more specific aspect the invention relates to means for mixing concrete or the like which is mountable on a vehicle having power take-off means and wherein a cone shaped roller or drive means is connected to the power take-off means and is engageable with a portion of the mixing barrel to rotate same during mixing operations. In a still further specific aspect the invention relates to concrete mixers for mounting on a tractor or the like and including a cone shaped roller or drive member mounted on the power take-off means and engageable with a frusto-conical portion on a mixing drum or the like so that the drum can be driven directly from the roller or power take-off means without the need for intermediate drive elements mountable on the drum or the like.

Concrete mixers are known to the art and includes mixers mounted on vehicles for movement therewith. Some prior art concrete mixer means are mountable on tractors or the like and are adapted to be driven from the power take-off of the tractor. However, such prior art concrete mixing devices for use with a tractor or the like normally require a separate friction or drive member, such as an automobile tire and wheel or the like mounted on the mixing barrel and engageable with a driving element on the power take-off means of the tractor so that the power take-off of the tractor can be used to turn the barrel. The additional drive means such as the tire and wheel mounted on the drum is rather expensive and requires special construction for the barrel for mounting of the wheel or hub on the mixing barrel and it is therefore desirable to eliminate the tire to thereby result in a less expensive article of manufacture. Also, improved drive means are desired whereby direct connection from the power take-off to the barrel for mixing operations can be obtained. In addition, with known concrete mixing apparatus the contact area between driving and driven elements frequently becomes wet in use and causes slippage between the parts which is undesirable and inefficient.

In accordance with the present invention mixing means for concrete or other materials and means for mounting the mixing means on a vehicle having power take-off means and lift means is provided and includes container means having an opening therein and support means rotatably mounting the container means and being operatively connectible to a vehicle or the like. Means are connected to the support means and connectible to lift means of the vehicle or the like for moving the support means and the container means, such as from a mixing means to a dumping position. Cone shaped roller means is provided and is connectible to power take-off means of the vehicle and engageable with a portion of the container means during mixing operations to cause rotation of the container means.

Accordingly, it is an object of the invention to provide new concrete mixing means.

Another object of the invention is to provide new concrete mixing means wherein tires or the like normally mounted on the mixing barrel and engageable with power take-off means have been eliminated.

A further object of the invention is to provide new drive connecting power take-off means and a mixing barrel with concrete mixing apparatus.

A further object of the invention is to provide new concrete mixing apparatus wherein expensive driving means have been eliminated and structurally different drive means are provided.

A still further object of the invention is to provide new cone shaped driving means for mounting on power take-off means of a vehicle with the cone shaped drive means being engageable with a barrel of a concrete mixer or the like.

A further object of the invention is to provide new cone drive means for cement mixers mountable on a tractor or the like and including means for drying the outer surface of the cone drive member to prevent slippage between the cone drive and the barrel.

Various other objects, advantages and features of the invention will be apparent to those skilled in the art from the following description taken in conjunction with the accompanying drawings in which.

Figure 1:
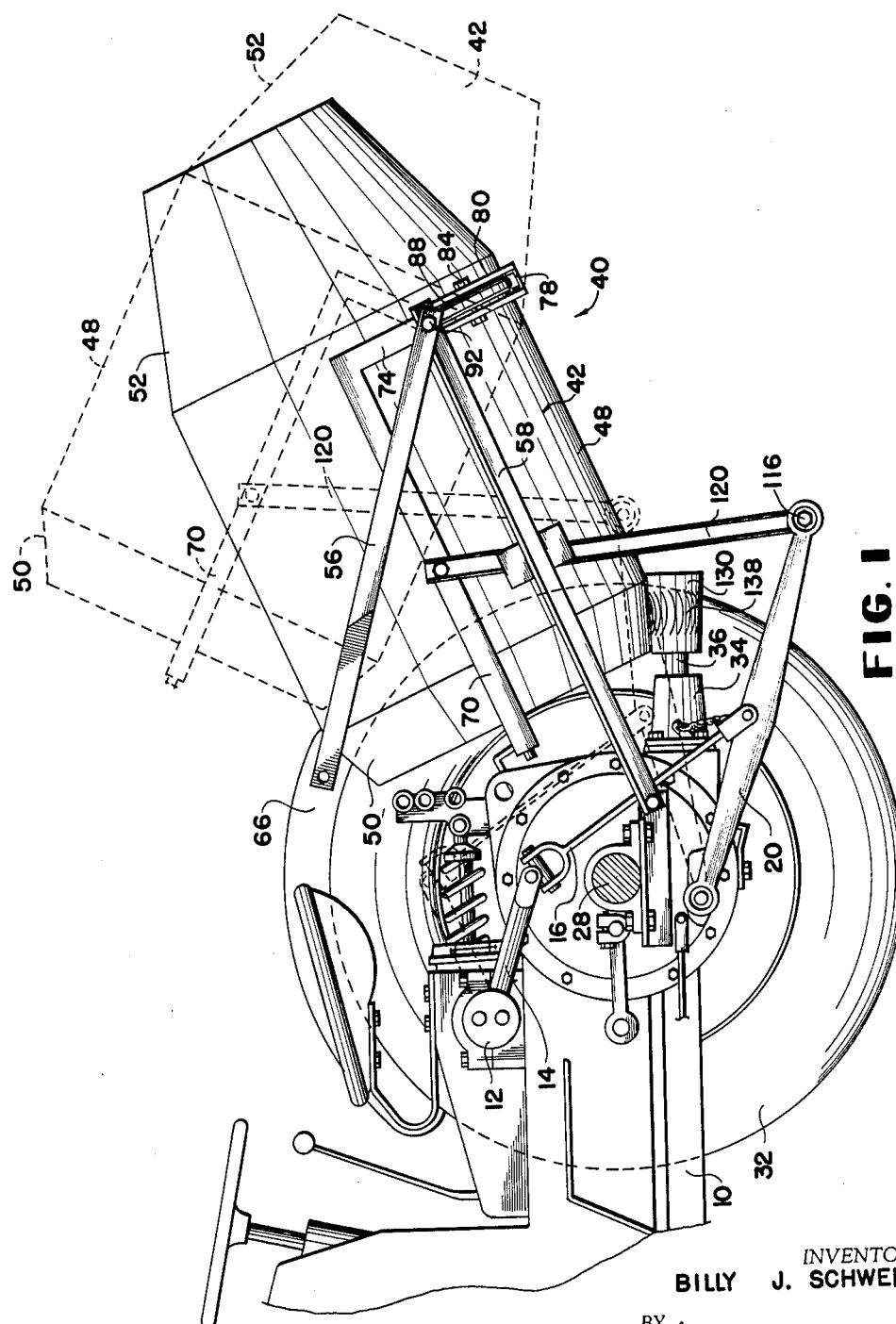
FIG. 1 is a side elevation view of a tractor, partially broken away, showing a preferred specific embodiment of a concrete mixer and cone drive means therefor of the invention mounted on the tractor.

The following is a discussion and description of a preferred specific embodiment of the new concrete mixing means of the invention, such being taken with reference to the drawings whereon the same reference numerals are used to indicate the same or similar parts and/or structure. It is to be understood that such discussion and description is not to unduly limit the scope of the invention.

Referring now to the drawings in detail, the means for mixing concrete or the like of the invention is constructed and adapted for mounting on and use with a vehicle, such as the tractor shown at 10 in the drawings, and preferably the vehicle has lift means and power take-off means associated therewith. As illustrated in the drawings, the tractor 10 has a shaft 12 at a rear end portion thereof which is connected to power means on the tractor in any suitable manner and arms as shown at 14 are connected to and project from opposite ends of the shaft 12, only one of the arms 14 being illustrated in the drawings. The outer ends of arms 14 are connected to one end portion of link members 16 and 18 and the other end portion of the link members are connected to intermediate portions of lift arms 20 and 22, each of which is pivotally connected in one end to the frame of the tractor 10 in any suitable manner. Chain means 24 and 26 can be provided and connected to the arms 20 and 22 and to the frame of the tractor 10 to thus limit movement of the lift arms. Upward movement of the lift arms 20 and 22 is accomplished by rotation of the shaft 12 which moves arms 14 to thereby move link members 16 and 18 and cause upward movement of the lift arms. Lift arms 20 and 22 can be moved downwardly by the force of gravity, or in some instances, the shaft 12 can be reversed and the lift arms forced downwardly. The tractor 10 is partially supported by mounting of the frame on an axle 28 which is supported by tires or wheels 30 and 32 in the usual and common manner.

The tractor 10 preferably has suitable power take-off means at a rear portion thereof, the housing for the power take-off means being shown at 34 in FIG. 1, and a shaft 36 is mounted in the housing 34 and is connectible to drive means of the tractor 10 for rotation. Shaft 36 preferably has splines 38 thereon for mounting of roller or drive means as described more fully hereinafter.

The concrete mixer and means for mounting same of the invention is shown generally at 40 and preferably includes an elongated hollow mixing barrel 42 which preferably has a closed end 44 and is open at the other end as shown at 46. The barrel 42 preferably has a generally cylindrical intermediate portion 48 and frusto-conical portions 50 and 52 adjacent the closed end 44 and the opening 46, respectively. Preferably mixing blades or the like 54 are provided and are mounted on the inner surface of the barrel 42 along the cylindrical portion 48 thereof so that as the barrel 48 is turned or rotated in operation the blades 54 will engage cement or other materials to be mixed therein and result in a thorough mixing of the material.

Frame means are provided for mounting the barrel 42. As shown in the drawings, the frame means includes a strap iron 56 having one end portion thereof positioned in abutting engagement with and connected to one end portion of an angle iron 58 and the strap iron and angle iron together define an acute angle and the other end portion of the strap iron 56 is connectible to a fender 60 of the tractor 10 and the angle iron 58 can be connected to the frame of the tractor adjacent the rear axle 28 thereof. Another strap iron 62 and angle iron 64 are provided and connected in one end portion to each other and the other end portion of the strap iron 62 is connected to the fender 66 of the tractor and the other end portion of the angle iron 64 is connected to the frame of the tractor adjacent the axle 28.

A cradle is provided for mounting or supporting the barrel 42 and includes an end portion 68 positioned adjacent the closed end 44 of the barrel 42 and the cradle includes side portions 70 and 72 which are connected to opposite ends of the end portion 68 and are positioned at the sides of the barrel 42. The other end portion of the cradle includes arms 74 and 76 which extend downwardly from the other ends of the side portions 70 and 72 and a connecting member 78 which is positioned beneath the cylindrical portion 48 of the barrel 42 adjacent the frusto-conical portion 52 thereof. The connecting member 78 can be connected to the arm members 74 and 76 by braces 80 and 82 and the braces 80 and 82 have pins 84 and 86, respectively passing therethrough which rotatably mount wheels 88 and 90, respectively. The wheels 88 and 90 project inwardly from the braces and engage the cylindrical portion 48 of the barrel 42 to thereby rotatably mount the barrel in the cradle. The arm members or portions 74 and 76 of the cradle are connected by pivots 92 and 94 to the frame means defined by the strap irons 56 and 62 and the angle irons 58 and 64.

Figures 3, 4, 5:
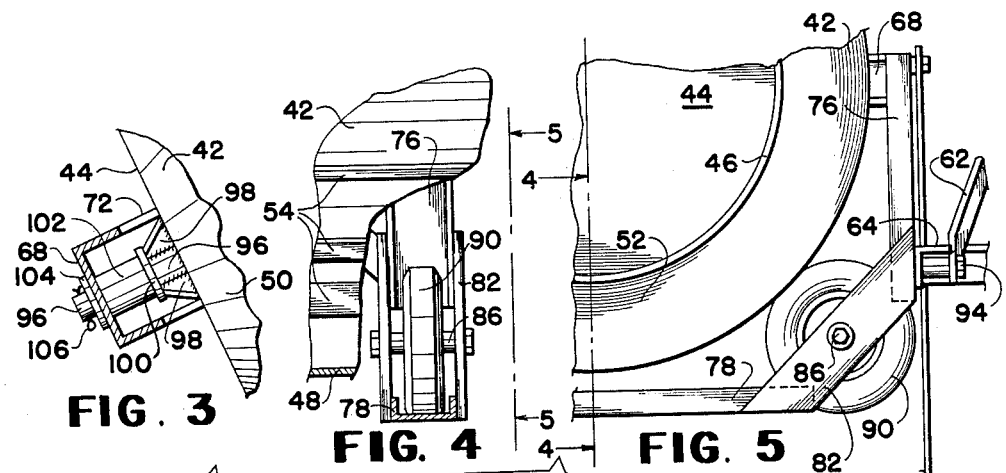
FIG. 3 is an enlarged view, partially in cross section, illustrating the connection between the closed end of the barrel and the cradle means for supporting the barrel.
FIG. 4 is an enlarged partial cross section view of a portion of the concrete mixer of FIGS. 1 and 2 taken along the line 4—4 of FIG. 5.
FIG. 5 is an enlarged partial elevation view taken from the rear of the concrete mixer of the invention taken along the line 5—5 of FIG. 4.

The closed end 44 of the barrel 42 is preferably supported by and rotatably connected to the end portion 68 of the cradle. As illustrated in FIG. 3, this can be accomplished by mounting a stud or shaft 96 on the closed end 44 of the barrel 42 and suitable braces 98 can be secured to the closed end 44 of the barrel and to the shaft 96 to accomplish this mounting. A washer or the like 100 is preferably secured to the outer end of the braces 98 and receives the shaft 96. A sleeve 102 can be positioned between the end portion 68 of the cradle and the washer 100 to receive the shaft 96 and, if desired, the sleeve 102 can be rigidly connected to the end portion 68 of the cradle or to the washer 100. The stud or shaft 96 projects through a hole in the end portion 68 of the cradle and another washer 104 is positioned around the stud or shaft 96 and a cotter pin or other suitable fastening means 106 is connected to shaft 96 to thereby retain the shaft 96 in the mounted position. Thus, the closed end 44 of the barrel 42 is rotatably mounted on the cradle so that when the barrel is moved to an elevated or dumping position as explained more fully hereinafter the barrel will be retained on the cradle.

Figure 2:
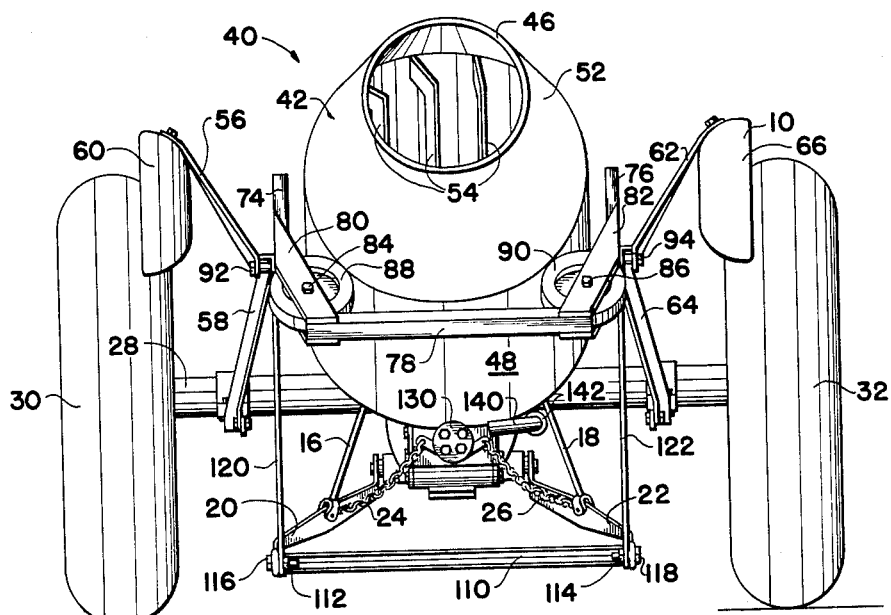
FIG. 2 is a view from the rear of the concrete mixer of FIG. 1.

An angle iron or spreader bar 110, FIG. 2, is preferably provided and is positioned between the outer ends of the lift arms 20 and 22 of the tractor and nuts 112 and 114 can be secured to the end portions of the spreader bar in any suitable manner, such as by welding. Bolts 116 and 118 pass through the ends of the lift arms 20 and 22, respectively, and are threadedly mounted in the nuts 112 and 114, respectively.

Two linkage members 120 and 122 are provided and one end portion of the linkage member 120 is positioned between lift arm 20 and nut 112 and has a hole therethrough receiving the bolt 116 and in a similar manner one end portion of the linkage member 122 is positioned between arm 22 and nut 114 and has a hole therethrough which receives the bolt 118 to thereby operatively connect the linkage members to the lift arms 20 and 22 of the tractor. The other end portions of the linkage members 120 and 122 are pivotally connected to intermediate portions of the side portions 70 and 72 of the cradle supporting barrel 42 so that upward movement of the lift arms 20 and 22 causes elevation of linkage members 120 and 122 to thereby move the cradle and barrel 42 about the pivots 92 and 94 from the position shown in the solid lines in FIG. 1 to the position shown in the dashed lines. The barrel 42 can be returned to the position shown in the solid lines in FIG. 1 by releasing the power lift means of the tractor and the weight of the barrel 42 and associated structures causes the lift arms 20 and 22, the cradle and the barrel 42 to be lowered.

Figures 6, 7:
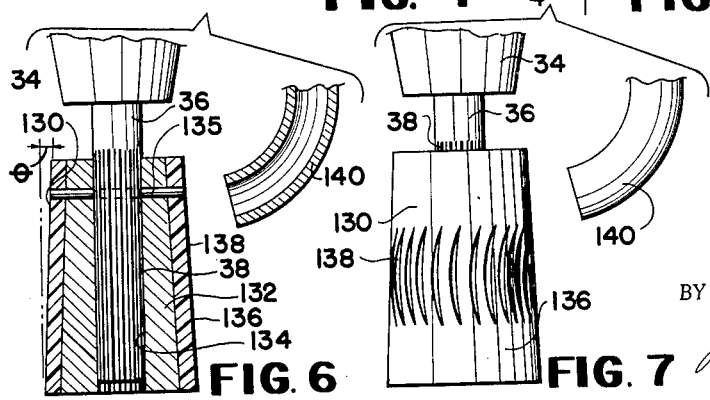
FIG. 6 is an enlarged cross section view illustrating the cone shaped drive means or roller of the invention and illustrating a conduit for exhaust gases adjacent thereto for drying same in operation.
FIG. 7 is an enlarged view similar to FIG. 6 but illustrating the outer surface of the cone shaped drive roller.

Means are provided which are connectible to the power take-off means of the vehicle 10 so that operation of the power take-off will cause rotation of the barrel 42 for mixing of materials therein. As best illustrated in FIG. 6 of the drawings, the cone shaped roller or drive member 130 is provided and preferably includes an inner body member 132 which is relatively rigid and can be made of any suitable metal, preferably an iron alloy, or other suitable material and preferably the body member 132 has a hole or opening 134 axially therethrough which is desirably grooved or splined to receive the splined shaft 36 of the power take-off mechanism of the vehicle 10. Fastening member 135 holds the roller 130 on the shaft 36. The body member 132 can be either cylindrical or conical in shape. The roller or drive member 130 preferably has an outer cover 136 of a traction exerting plastic material which is bonded or otherwise connected to the body member 132 and the outer surface 138 of the cover 136 can be roughened if desired, to further increase the traction or friction characteristics of the surface. The cover portion 136 of member 130 can be of any suitable material which produces the desired traction or friction surface such as reinforced material and/or synthetic rubbers, and polyurethane plastic material, a relatively high density foam of such, has been found very satisfactory, such being relatively tough and producing a friction or traction type surface of the type desired. The surface 138 of cover 136 is preferably frusto-conical in shape as illustrated in FIG. 6 and is inclined outwardly from the inner end to the outer end at a relatively small angle $\theta$, preferably at an angle in the range of 1½ to 3½ degrees, and the angle $\theta$ shown in FIG. 6 which is about 2½ degrees has been found very satisfactory. When the angle $\theta$ is about 2½ degrees, then the frusto-conical portion 50 of the barrel 42 is preferably at an angle of about 22½ degrees so that the axis of the cylindrical portion 48 of the barrel 42 is inclined at an angle of about 25 degrees relative to the horizontal plane of the tractor 10. Corresponding angles are preferably employed when the angle θ is larger or smaller than 2½ degrees. In operation, the surface 138 of the cover 136 of the cone shaped drive member 130 frictionally engages the frusto-conical portion 50 of the barrel 42 and is in traction engagement therewith so that rotation of shaft 36 by operation of the tractor power take-off means causes rotation of the barrel 42 within the cradle supporting same. By inclining the surface 138 on drive member 130 and the portion 50 on barrel 42, substantially the entire weight of the barrel and cradle rests on the drive member 130 which improves traction between member 130 and the barrel.

In mixing concrete or other materials, water is supplied to the barrel 42 and in some instances water may flow along the outer surface of the barrel onto portion 50 thereof and tend to cause the barrel 42 to slip relative to the cone shaped drive member 130. In order to eliminate the possibility of slippage, a tube or conduit 140 is preferably provided and has one end portion thereof positioned adjacent the outer surface of the drive member or roller 130 and the other end portion thereof is connected by a coupling member or the like 142, FIG. 2, to the exhaust pipe of the tractor or vehicle 10 so that when the vehicle is operating relatively hot exhaust gases are directed through the tube or conduit 140 onto the outer surface 138 of the cone shaped roller 130 to continually dry the outer surface of the roller and thereby prevent any tendency of the barrel to slip on the roller 130 as a result of the presence of water or other liquids on the roller 130 or on the frusto-conical portion 50 of the barrel 42.

The concrete mixer and means for mounting same can be rapidly mounted on a tractor or other vehicle 10 by connecting the strap irons 56 and 62 and the angle irons 58 and 64 to the tractor and connecting same to the cradle. The cone shaped roller or drive member 130 can then be secured to the shaft 38 of the power take-off means. The barrel or drum 42 is then positioned in the cradle and connected to the end portion 68 of the cradle as illustrated in FIG. 3. The link members 120 and 122 are then connected to the cradle and to the lift arms 20 and 22 of the tractor or other vehicle 10. When the barrel 42 is positioned in the cradle the portion 50 of the barrel is in engagement with the outer surface of the roller 130.

By providing the cone shaped pulley or roller 130 and the traction producing surface on the cover 136 thereof, a wheel or tire normally provided with many prior art mixing means and connected to the closed end of the barrel 42 for driving or rotating the barrel can be eliminated and in use the traction or friction drive or connection between the drive member 130 and the barrel has proved quite satisfactory. In addition, use of the tube or conduit 140 permits dry operation and substantially eliminates any slippage between the drive member 130 and the barrel 42.

While the invention has been described in connection with preferred specific embodiments thereof, it will be understood that such discussion and description is intended to illustrate and not to unduly limit the scope of the invention which is defined by the claims.

I claim:

1. A concrete mixer and means for mounting same on a tractor or the like having power lift means at a rear portion thereof including a rotatable shaft connected to power means of the tractor and having arms projecting therefrom at the ends thereof with the outer end portion of said arms being connected to one end portion of link members and with the other end portion of said link members being connected to intermediate portions of two lift arms each of which is pivotally connected in one end to the tractor frame, said tractor having a rotatable power take-off shaft at the rear end thereof, said concrete mixer and means for mounting same comprising, in combination, an elongated hollow mixing barrel closed at one end and open at the other end and having a generally cylindrical intermediate portion, two frames for mounting said barrel positioned at opposite sides of said barrel, a cradle having one end portion positioned adjacent said closed end of said barrel and having spaced side portions connected to opposite ends of said one end portion and positioned at the sides of said barrel, the other end portion of said cradle being positioned beneath said cylindrical portion of said barrel and in spaced relation thereto and being pivotally connected to said frames at said one end portion of said angle iron and said strap iron, two wheels positioned in spaced relation and rotatably mounted on said other end portion of said cradle with said cylindrical portion of said barrel resting on and being supported by said wheels, a stud secured in one end to the outer surface of said closed end of said barrel coaxial with said cylindrical portion of said barrel and rotatably connected to said one end portion of said cradle, two linkage members, each of said side portions of said cradle having one end portion of one of said linkage members secured thereto at an intermediate portion thereof in spaced relation to the pivotal connection between said frames and said other end portion of said cradle and the other end portion of each of said linkage members being pivotally connected to outer ends of said lift arms, a cone shaped roller having an inner body member with a hole therethrough receiving said power take-off shaft of said tractor, said body member of said roller being connected to said shaft for rotation therewith, said roller having an outer cover of a traction exerting plastic material connected to said body member with the outer surface of said cover being roughened to provide a friction surface, said surface of said cover being inclined outwardly at an angle of about two and one-half degrees from the inner end thereof to the outer end thereof, said barrel having a frusto-conical portion tapered inwardly at an angle of about twenty-two degrees from an intermediate portion of said barrel to said closed end thereof with said frusto-conical portion of said barrel in mixing operation engaging said surface of said cone shaped roller so that rotation of said roller by said power take-off shaft of said tractor causes rotation of said barrel for concrete mixing operations, and a tube connected in one end to the exhaust of said tractor and having the other end thereof positioned adjacent said surface on said cone shaped roller, said concrete mixer and means for mounting same being constructed and adapted so that said barrel can be loaded through said open end when said closed end thereof and said lift arms are in a lowered position with said barrel being movable to a dumping position by elevation of said lift arms to cause movement of said linkage members to elevate said one end portion of said cradle and said closed end of said barrel about the pivotal connection of said frames and said other end portion of said cradle.

2. A concrete mixer and means for mounting same on a tractor or the like having lift means and a power take-off shaft, said cement mixer and means for mounting same comprising, in combination, an elongated hollow mixing barrel closed at one end and open at the other end thereof and having a generally cylindrical intermediate portion, frame means for mounting said barrel having portions positioned adjacent said barrel, a cradle having one end portion thereof positioned adjacent said closed end of said barrel and having side portions positioned at the sides of said barrel with the other end portion of said cradle being positioned beneath said cylindrical portion of said barrel and in spaced relation thereto, means rotatably mounting said closed end of said barrel on said one end portion of said cradle with said other end portion of said cradle being pivotally connected to said frame means, wheel means rotatably mounted on said other end portion of said cradle and engaging said cylindrical portion of said barrel, link means connected to said lift means of said tractor and to said intermediate portion of said cradle so that movement of said lift means of said tractor causes movement of said cradle and said barrel about said frame means, a cone shaped roller having an inner body member with a hole therethrough receiving said power take-off shaft of said tractor with said body member being connected to said shaft for rotation therewith, said roller having an outer cover of friction material connected to said body member and with the outer surface of said cover being inclined from one end portion thereof to the other end portion thereof, a tube connected at one end to the exhaust of said tractor and having the other end thereof positioned adjacent said surface on said cone shaped roller, said barrel having a frusto-conical portion adjacent said closed end of said barrel with said frusto-conical portion of said barrel engaging said surface of said cone shaped roller so that rotation of said roller causes rotation of said barrel for concrete mixing operations, said concrete mixer and means for mounting same being constructed and adapted so that said barrel can be loaded through said open end thereof and said barrel can be rotated by said power take-off means for concrete mixing, said barrel being movable to a dumping position by elevation of said lift means and said linkage means to thereby move said cradle and said barrel relative to said frame means.

3. A concrete mixer and means for mounting same on a tractor or the like having power lift means at a rear portion thereof including a rotatable shaft connected to power means of the tractor and having arms projecting therefrom at the ends thereof with the outer end portions of said arms being connected to end portions of link members and with the other end portions of said link members being connected to intermediate portions of two lift arms, each of which is pivotally connected in one end to the tractor frame, said tractor having a rotatable power take-off shaft at the rear end thereof, said concrete mixer and means for mounting same comprising, in combination, an elongated hollow mixing barrel closed at one end and open at the other end and having a generally cylindrical intermediate portion, two frames for mounting said barrel positioned at opposite sides of said barrel, a cradle having one end portion positioned adjacent said closed end of said barrel and having spaced side portions connected to opposite ends of said one end portion and positioned at sides of said barrel, the other end portion of said cradle being positioned beneath said cylindrical portion of said barrel and in spaced relation thereto and being pivotally connected to said frames, a plurality of rollers positioned in spaced relation and rotatably mounted on said other end portion of said cradle with said barrel resting on and being supported by said rollers, a shaft secured in one end to the outer surface of said closed end of said barrel coaxial with said cylindrical portion of said barrel and rotatably connected to said one end portion of said cradle, two linkage members, each of said side portions of said cradle having one end portion of one of said linkage members secured thereto at an intermediate portion thereof in spaced relation to the pivotal connection between said frames and said other end portion of said cradle, and the other end portion of each of said linkage members being pivotally connected to the outer ends of said lift arms, a cone shaped roller having an inner body member with a hole therein receiving said power take-off shaft of said tractor, said body member of said cone shaped roller being connected to said shaft for rotation therewith, the surface of said cone shaped member being inclined outwardly at an angle approximately in the range of 1½ to 3½ degrees from the inner end thereof to the outer end thereof, said barrel having a frusto-conical portion tapered inwardly at an angle approximately in the range of 21 to 23 degrees from the intermediate portion of said barrel to said closed end thereof with said frusto-conical portion of said barrel in mixing operation engaging said surface of said cone shaped roller so that rotation of same by said power take-off shaft of said tractor causes rotation of said barrel for concrete mixing operation, said concrete mixer and means for mounting same being constructed and adapted so that said barrel can be loaded through said open end when said closed end and said lift arms are in a lowered position with said barrel being movable to a dumping position by elevation of said left arms to cause movement of said linkage members to elevate said one end portion of said cradle and said closed end of said barrel about the pivotal connection of said frames and said outer end portion of said cradle.

References Cited by the Examiner
UNITED STATES PATENTS 2,656,164  10/53  Knowlton   259—171
2,813,705  11/57  Parish   259—81

CHARLES A. WILLMUTH, *Primary Examiner.*